United States Patent
Fujita

(10) Patent No.: US 9,780,443 B2
(45) Date of Patent: Oct. 3, 2017

(54) RADAR APPARATUS

(71) Applicant: DENSO CORPORATION, Kariya, Aichi-pref. (JP)

(72) Inventor: Akihisa Fujita, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 4 days.

(21) Appl. No.: 14/414,359

(22) PCT Filed: Jul. 4, 2013

(86) PCT No.: PCT/JP2013/068344
§ 371 (c)(1),
(2) Date: Jan. 12, 2015

(87) PCT Pub. No.: WO2014/010502
PCT Pub. Date: Jan. 16, 2014

(65) Prior Publication Data
US 2015/0207217 A1  Jul. 23, 2015

(30) Foreign Application Priority Data

Jul. 13, 2012 (JP) ................................. 2012-157998

(51) Int. Cl.
*H01Q 1/42* (2006.01)
*H01Q 1/32* (2006.01)
(Continued)

(52) U.S. Cl.
CPC ............. *H01Q 1/42* (2013.01); *G01S 7/2813* (2013.01); *H01Q 1/3233* (2013.01);
(Continued)

(58) Field of Classification Search
CPC H01Q 1/46; H01Q 1/42; H01Q 1/421; H01Q 1/3233
(Continued)

(56) References Cited

U.S. PATENT DOCUMENTS

2004/0135720 A1*  7/2004  Sasada ................. H01L 23/552
342/175
2005/0001757 A1  1/2005  Shinoda et al.
(Continued)

FOREIGN PATENT DOCUMENTS

| CN | 102565779 | 7/2012 |
|---|---|---|
| JP | 2001044750 A | 2/2001 |

(Continued)

OTHER PUBLICATIONS

Office Action dated Dec. 25, 2015 in corresponding Chinese Application No. 201380037379.7 with English translation.
(Continued)

*Primary Examiner* — Dieu H Duong
(74) *Attorney, Agent, or Firm* — Harness, Dickey & Pierce, P.L.C.

(57) ABSTRACT

A radar apparatus is provided that is capable of providing desired directivity without preventing downsizing of the apparatus. In the radar apparatus, an antenna for at least either transmitting radar waves or receiving reflected waves is protected by a radome. Provided on an opposing face that is a face of the radome opposing the antenna is a wall section protruding from the opposing face of the radome into a space of the radome and extending along at least a portion of an outline of an aperture projection. The aperture projection is a projection of an aperture of the antenna onto the opposing face in a normal direction to the aperture.

9 Claims, 10 Drawing Sheets

(51) Int. Cl.
*G01S 7/28* (2006.01)
*G01S 13/93* (2006.01)
*G01S 7/02* (2006.01)

(52) U.S. Cl.
CPC ............ *H01Q 1/421* (2013.01); *G01S 13/931* (2013.01); *G01S 2007/027* (2013.01)

(58) Field of Classification Search
USPC ........................................................ 343/872
See application file for complete search history.

(56) References Cited

U.S. PATENT DOCUMENTS

| | | |
|---|---|---|
| 2005/0068247 A1 | 3/2005 | Yoneya et al. |
| 2005/0128134 A1 | 6/2005 | Shinoda et al. |
| 2006/0238429 A1 | 10/2006 | Yoneya et al. |
| 2012/0105300 A1 | 5/2012 | Ando et al. |

FOREIGN PATENT DOCUMENTS

| | | |
|---|---|---|
| JP | 2003243920 A | 8/2003 |
| JP | 2004-325160 A | 11/2004 |
| JP | 2005-109687 A | 4/2005 |
| JP | 2005249659 A | 9/2005 |
| JP | 2007013311 A | 1/2007 |
| JP | 2010210297 A | 9/2010 |
| JP | 2012093305 A | 5/2012 |

OTHER PUBLICATIONS

International Search Report (in Japanese with English Translation) for PCT/JP2013/068344, mailed Aug. 6, 2013; ISA/JP.

International Preliminary Report on Patentability (in Japanese with English Translation) for PCT/JP2013/068344, issued Jan. 13, 2015; ISA/JP.

Office Action dated Nov. 10, 2015 in corresponding Japanese Application No. 2012-157998 with English translation.

\* cited by examiner

FIG.5
(a)
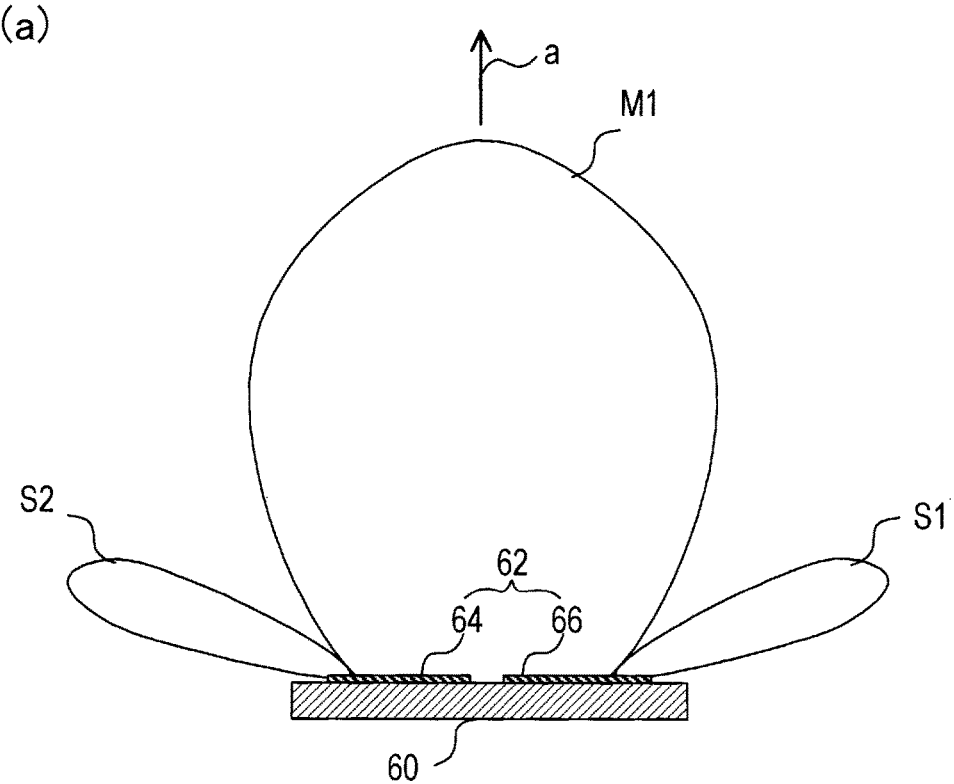
(b)
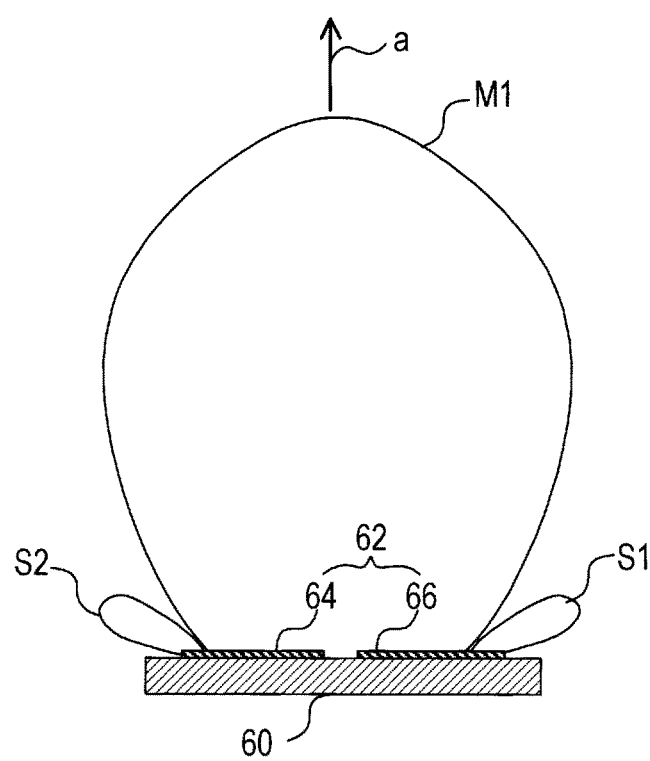

FIFTH PATH
SIXTH PATH

RADAR APPARATUS

CROSS REFERENCE TO RELATED APPLICATIONS

This application is a U.S. National Phase Application under 35 U.S.C. 371 of International Application No. PCT/JP2013/068344 filed on Jul. 4, 2013 and published in Japanese as WO 2014/010502 A1 on Jan. 16, 2014. This application is based on and claims the benefit of priority from Japanese Patent Application No. 2012-157998 filed Jul. 13, 2012. The entire disclosures of all of the above applications are incorporated herein by reference.

TECHNICAL FIELD

The present invention relates to a radar apparatus including an antenna and a radome for protecting the antenna.

BACKGROUND ART

A radar apparatus transmits radio waves and receives reflected waves from an obstacle present in the environment to detect a distance and a direction and the like to the obstacle. In the radar apparatus, an antenna is protected by a radome.

A radar apparatus known as such a radar apparatus is provided with a radome including an attenuation radome section (see Patent Literature 1). The attenuation radome section described in Patent Literature 1 includes a core layer formed of a material for providing high losses to radio waves to be transmitted and received via the antenna (hereinafter referred to as radar waves), thereby reducing the radio wave radiation in a direction through the attenuation radome section.

CITATION LIST

Patent Literature

[Patent Literature 1] Japanese Patent Application Laid-Open Publication No. 2003-243920

SUMMARY OF INVENTION

Technical Problem

Unfortunately, since a radio-wave attenuation rate of the attenuation radome section described in Patent Literature 1 increases proportionately to the thickness of the core layer, the thickness of the core layer has to be increased when it is necessary to sufficiently attenuate the radio wave radiation to provide desired directivity. This may hinder downsizing of the apparatus.

In consideration of the foregoing, it would be desirable to have a radar apparatus capable of providing desired directivity without hindering downsizing of the apparatus.

Solution to Problem

According to one embodiment of the present invention, there is provided a radar apparatus including: an antenna for at least either transmitting radar waves or receiving reflected waves; a radome transmissive to the radar waves; and a wall section. The wall section is provided on a face of the radome opposing the antenna (referred to as an opposing face). The wall section is configured to protrude from the opposing face of the radome into the space of the radome and extend along at least a portion of an outline of an aperture projection that is a projection of an aperture of the antenna onto the opposing face in a normal direction to the aperture.

More specifically, the wall section may be configured to intermittently extend along the outline of the aperture projection. Alternatively, in some embodiments, the wall section may be configured to surround the outline of the aperture projection, or may be provided only in directions, in which directions the radar waves are to be reduced.

With the radar apparatus configured as above, among directivities of the antenna, the wall section can reduce side lobes that may be formed in directions away from the normal direction to the aperture of the antenna. The wall section is provided inside the radome. Therefore, desired directivity can be achieved without preventing downsizing of the radar apparatus.

According to one embodiment, the radar apparatus may be configured such that the wall section includes a plurality of walls spaced away from each other in a direction from the aperture projection to outside the apparatus. The plural walls can increase a radar wave attenuation.

According to one embodiment, the radar apparatus may be configured such that the plurality of walls include at least one first wall of a thickness set to (2n−1) quarter wavelengths of the radar wave propagating through the first wall (where n is a positive integer).

With the radar apparatus configured as above, for example, when the radar waves are transmitted from the antenna through the radome, a path difference between a transmit wave that exits a first wall without being reflected and a transmit wave that exits the first wall after multiple reflections within the first wall may become an integer multiple of a half wavelength of the radar waves, which corresponds to a one-half-wavelength phase shift therebetween. This allows these transmit waves to be cancelled out.

This can more efficiently attenuate the radar waves propagating through the wall section including the first walls. When the wall section includes the plurality of first walls, the radar waves may be attenuated more efficiently.

BRIEF DESCRIPTION OF DRAWINGS

FIG. 5(a) is a schematic of combined directivity of an antenna section, and FIG. 5(b) is a schematic of combined directivity of the antenna section affected by reflected waves in the presence of a wall section;

DESCRIPTION OF EMBODIMENTS

Embodiments of the present invention will be described more fully hereinafter with reference to the accompanying drawings.

First Embodiment

<Configuration>

Figure 1:
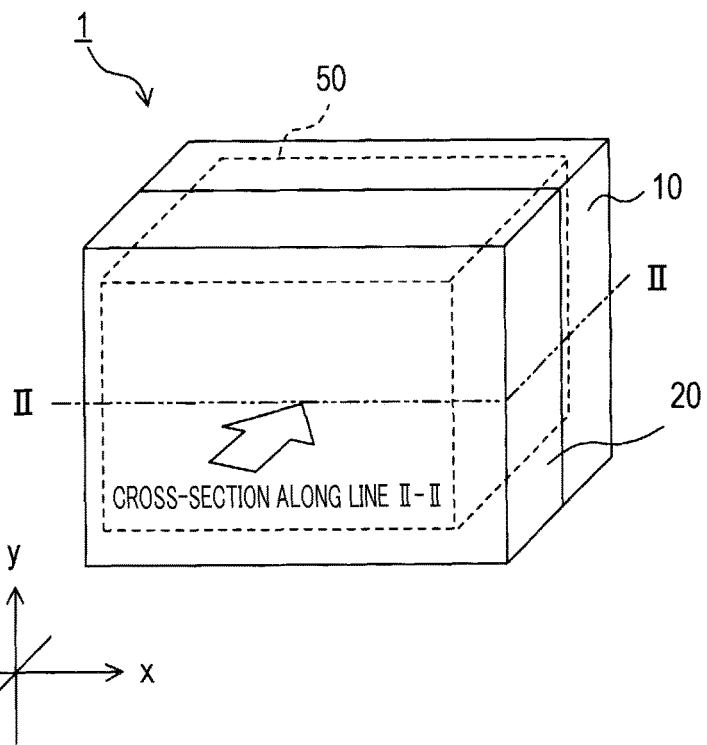
FIG. 1 is a perspective view of a radar apparatus in accordance with a first embodiment of the present invention.

A radar apparatus 1 in accordance with a first embodiment as shown in FIG. 1, which is mounted in a vehicle, is configured to transmit radio waves of a predetermined frequency f0 (hereinafter referred to as radar waves) and receive reflected waves from an object present in an environment around the vehicle to thereby identify the object.

The radar apparatus 1 includes a radar section 50 having a circuit board 60 with antennas formed thereon and being configured to transmit and receive radar waves to identify an object in the environment around the vehicle, a body 10 containing the radar section 50, and a radome 20 attached to the body 10 to protect the circuit board 60 of the radar section 50 in the body 10.

Figure 2:
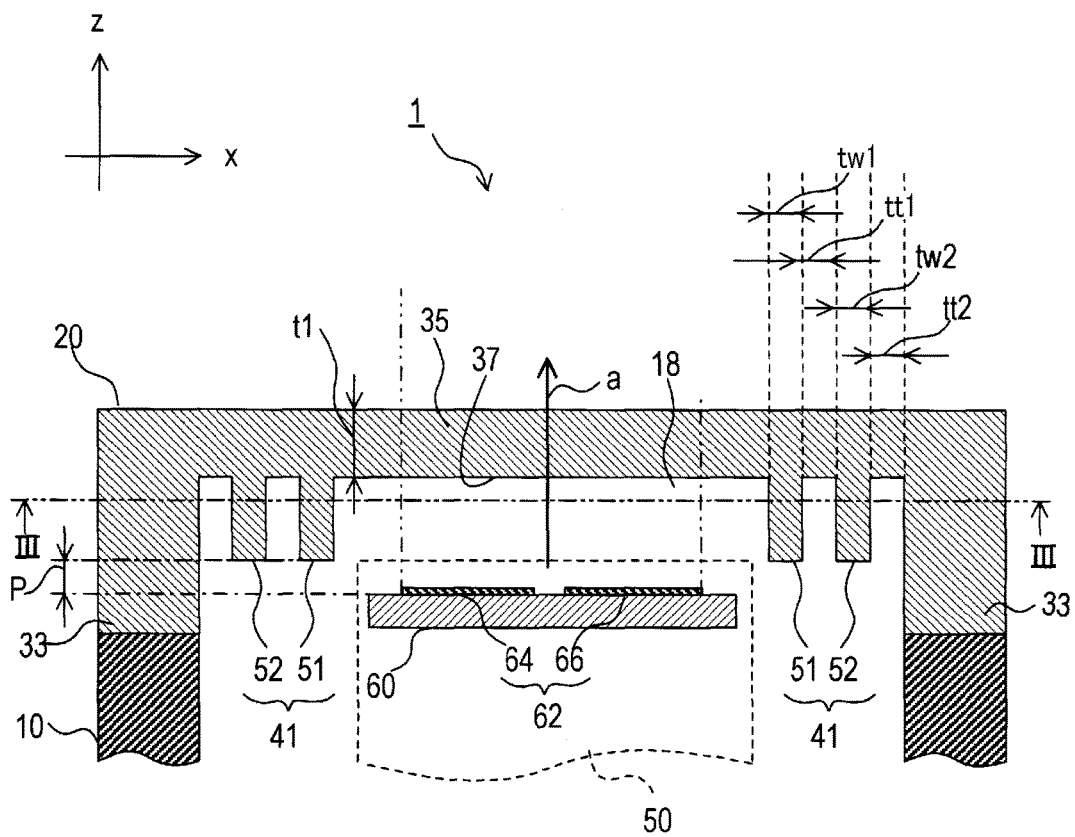
FIG. 2 is a cross-sectional view of the radar apparatus taken along line II-II of FIG. 1.

As shown in FIG. 2, a transmit antenna section 64 for transmitting radar waves and a receive antenna section 66 for receiving reflected waves from an object in the environment around the vehicle are both formed on one of faces of the circuit board 60. The circuit board 60 is positioned in an opening of the body 10 such that the face of the circuit board 60 on which the antenna sections 64, 66 are formed (herein after referred to as an "antenna-forming face") is exposed to a radome 20 side of the body 10. In the following, the antenna sections 64, 66 are hereinafter collectively referred to as an antenna section 62 unless otherwise specifically indicated.

The antenna section 62 has a combined directivity of directivities of the transmit antenna section 64 and a directivity of the receive antenna section 66. The combined directivity extends in a normal direction (indicated by the arrow a in FIG. 2) to an area of the antenna-forming face where the antenna sections 64, 66 are formed (hereinafter referred to an "antenna aperture") and is bilaterally symmetric about the normal direction a. In the following, the normal direction a is referred to as a beam direction a of the antenna section 62. The beam direction a corresponds to a Z-coordinate direction as shown in FIG. 1.

The radome 20 is formed of a radar-wave transmissive material that is a material transparent to the radar waves with low losses. A thickness t1 of a front portion 35 of the radome 20 opposing the circuit board 60, that is, lying in the beam direction a of the antenna section 62, as defined in the equation (1), is set to a half wavelength of the radar wave propagating in the transmissive material.

[Math. 1]

$$t_1 = \frac{1}{2}\left(\frac{\lambda_0}{\sqrt{\varepsilon_1}}\right) \quad (1)$$

Where λ0 is the wavelength of the radar wave propagating in free-space, and ϵ1 is the permittivity of the transmissive material. A wall section 41 includes first walls 51, 52 both protruding from a face 37 of the front portion 35 of the radome 20 opposing the circuit board 60 (hereinafter referred to as an "opposing face") into space 18 inside the radome 20 (hereinafter referred to as "radome space").

Figure 3:
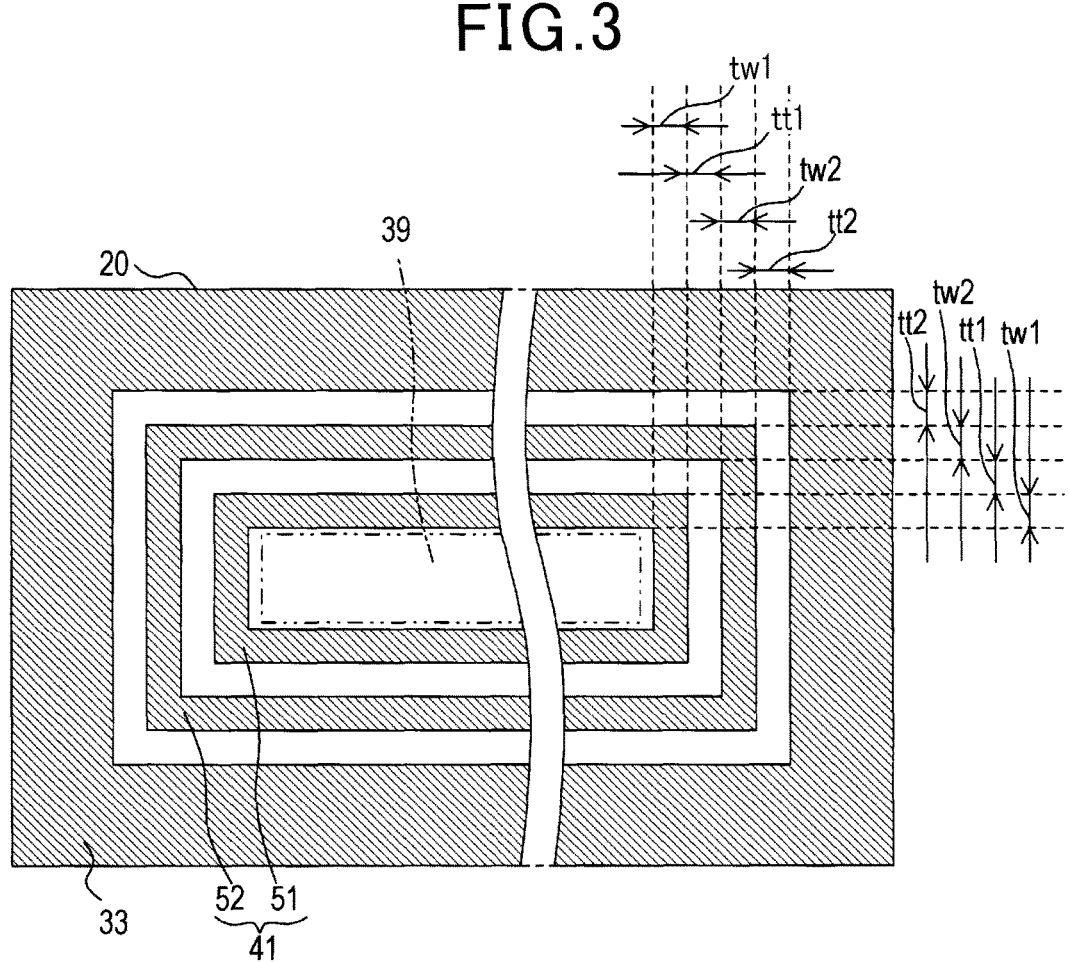
FIG. 3 is a cross-sectional view of the radar apparatus taken along line III-III of FIG. 2.

The first walls 51, 52 are formed of the same transmissive material as the radome 20 and positioned so as to surround the outline of a projection 39 of the antenna aperture onto the opposing face 37 in the normal direction a (hereinafter referred to as an "aperture projection") (see FIGS. 2, 3). Thicknesses tw1, tw2 of the first walls 51, 52 are both set to a value t2 equal to (2n−1) quarter wavelengths of the radar wave propagating in the transmissive material, as defined in the following equation (2) (where n is a positive integer) (in the present embodiment, the thicknesses tw1, tw2 are set to a value t2 for n=1 in the equation (2)).

[Math. 2]

$$t_2 = \frac{1}{4}\left(\frac{\lambda_0}{\sqrt{\varepsilon_1}}\right) \times (2n - 1) \quad (2)$$

The first walls 51, 52 are spaced a predetermined distance tt1 away from each other in a direction from the aperture projection 39 to outside the apparatus 1. The spacing tt1 is set to a value t3 equal to (2n−1) quarter wavelengths of the radar wave propagating in free-space (where n is a positive integer) as defined in the following equation (3) (in the present embodiment, the spacing tt1 is set to a value of t3 for n=1 in the equation (3)).

[Math. 3]

$$t_3 = \frac{1}{4}\left(\frac{\lambda_0}{\sqrt{\varepsilon_2}}\right) \times (2n - 1) \quad (3)$$

Where ϵ2 is the permittivity in the radome-space 18. In addition, the first wall 52 is positioned such that a spacing tt2 between the first wall 52 and a side wall 33 of the radome 20 is equal to the spacing tt1.

Preferably, the protrusions (heights) of the first walls 51, 52 from the opposing face 37 may be set such that the tops of the first walls 51, 52 are as close to the antenna-forming surface of the circuit board 60 as possible. In the present embodiment, the first walls 51, 52 have the same height that is set such that a spacing P between the tops of the first walls 51, 52 and the antenna-forming surface is equal to or less than a quarter wavelength of the radar wave propagating in the radome-space 18.

<Operation>

Figure 4:
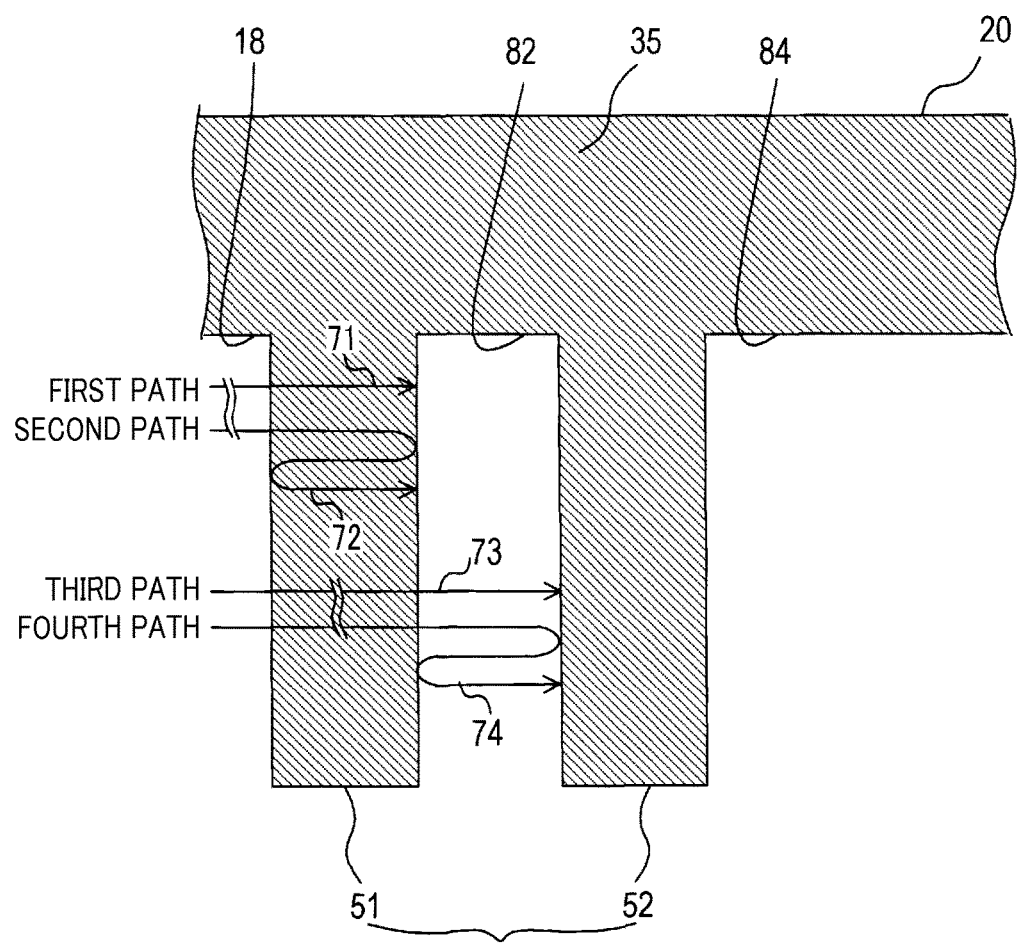
FIG. 4 is an example of various paths of radar waves propagating through a first wall.

The operation of the wall section 41 will now be explained in an exemplary scenario where the radar waves are transmitted from the antenna section 62 to outside the radar apparatus 1 through the radome 20. As shown in FIG. 4, a first air layer 82 lies between the first walls 51, 52, and a second air layer 84 lies between the first wall 52 and the side wall 33 of the radome 20.

There are various possible paths, along which the radar waves are transmitted outside the radar apparatus 1 through the radome-space 18, the first wall 51, the first air layer 82, the first wall 52, and the second air layer 84. As shown in FIG. 4, the possible paths include, as an example, a first path 71 along which the radar waves enter the first wall 51 and exit the first wall 51 without being reflected within the first wall, and a second path 72 along which the radar waves enter the first wall 51 and exit the first wall 51 after reflected at the interfaces between the first wall 51 and the first air layer 82 and between the first wall 51 and the radome-space 18. That is, the radar waves experience multiple reflections within the first wall 51.

The possible paths further include, as an example, a third path 73 along which the radar waves exit the first wall 51 and enter the first wall 52 without being reflected within the first air layer 82, and a fourth path 74 along which the radar waves enter the first air layer 82 and enter the first wall 52 after reflected at the interfaces between the first air layer 82 and the first wall 52 and between the first air layer 82 and the first wall 51. That is, the radar waves experience multiple reflections within the first air layer 82.

Assuming that the radar wave propagating along the first path 71 and the radar wave propagating along the second path 72 enter the first wall 51 in the same phase, a path difference between the radar wave that exits the first wall 51 after propagating along the first path 71 and the radar wave that exits the first wall 51 after propagating along the second path 72 is a half wavelength of the radar wave propagating through the first wall 51. The path difference of a half wavelength allows these radar waves to cancel each other out.

Similarly, assuming that the radar wave propagating along the third path 73 and the radar wave propagating along the fourth path 74 enter the first air layer 82 in the same phase, a path difference between the radar wave that enters the first wall 52 after propagating along the third path 73 and the radar wave that enters the first wall 52 after propagating along the fourth path 74 is a half wavelength of the radar wave propagating in the first air layer 82. These radar waves also cancel each other out due to the path difference.

In the above, the radar waves propagating the first to fourth path 71-74 have been described as an example. In general, when a path difference between a pair of radar waves propagating along different paths is an odd multiple of a half wavelength, these radar waves can cancel each other out.

<Advantages>

As described above, in the radar apparatus 1 of the present embodiment, the wall section 41 including the first walls 51, 52 is provided such that the radar waves passing through the first walls 51, 52 can cancel each other out due to the path difference therebetween. With this configuration, radar waves propagating in directions that are away from the beam direction a of the antenna section 62 can be attenuated. More specifically, for example, when the antenna section 62 has the combined directivity of a main lobe M1 and side lobes S1, S2, as shown in FIG. 5(a), the wall section 41 can reduce the side lobes S1, S2 formed in the directions away from the beam direction a of the antenna section 62, as shown in FIG. 5(b).

Since the wall section 41 is provided inside the radome 20, the wall section 41 is unlikely to adversely affect the dimensions (size) of the radar apparatus 1. Therefore, desired directivity can be achieved without preventing downsizing of the radar apparatus 1.

In addition, the wall section 41 may further include one or more first walls added to the first walls 51, 52 in a direction from the aperture projection 39 to outside the apparatus 1 with the spacing tt1 between adjacent first walls set to the value t3. An increased number of the first walls can further reduce the side lobes S1, S2 in directions that are away from the beam direction a.

The spacing between the adjacent first walls 51, 52 is set such that a path difference between the radar waves propagating through the first air layer 82 allows the radar waves to cancel each other out. This can efficiently attenuate the radar waves propagating in directions away from the beam direction a of the antenna section 62.

The wall section 41 is formed of the same material as the radome 20, which allows the wall section 41 and the radome 20 to be produced in the same process. That is, this can simplify the manufacturing process.

Second Embodiment

Figure 6:
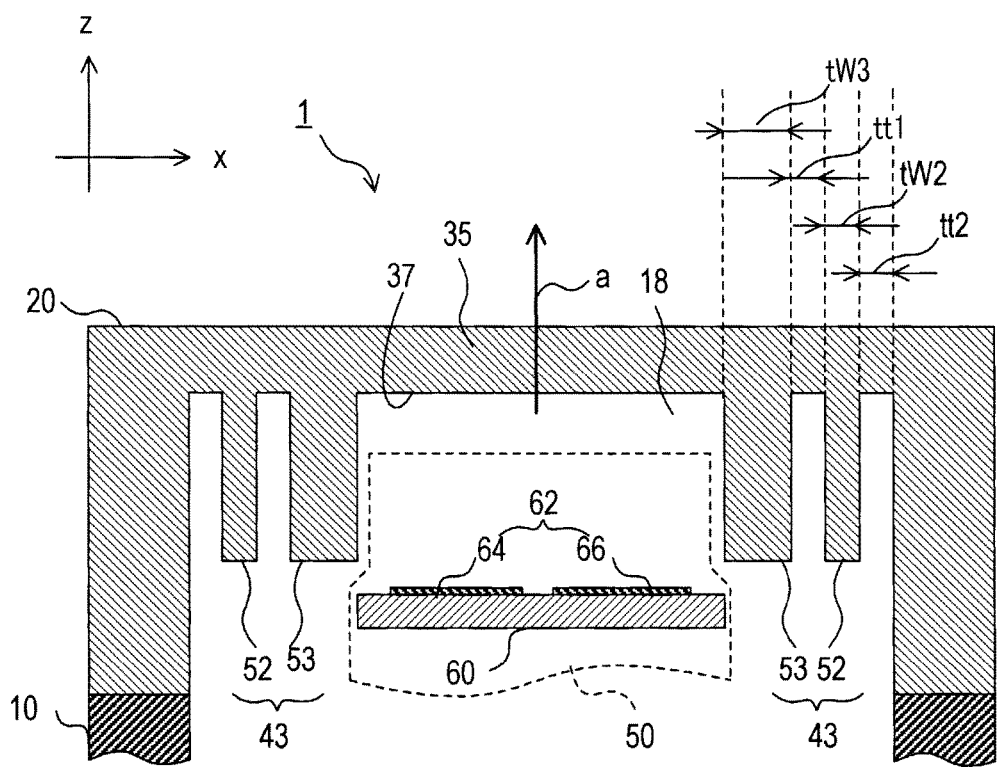
FIG. 6 is a schematic of a radar apparatus in accordance with a second embodiment of the present invention.

A radar apparatus 2 in accordance with a second embodiment will now be explained. Unlike the radar apparatus 1 of the first embodiment where the wall section 43 is comprised of the first walls, the radar apparatus 2 as shown in FIG. 6 is configured such that the wall section 43 is comprised of the first wall 52 and the second wall 53 that is different in thickness from the first wall 52. Only differences of the second embodiment from the first embodiment will be explained.

<Wall Section Configuration>

The wall section 43 includes the first wall 52 and a second wall 53 positioned closer to the aperture projection 39 than the first wall 52. The second wall 53 has a thickness set to a value t4 that is equal to (2n−1) half wavelengths of the radar wave propagating in the second wall 53, as defined in the following equation (4) (where n is a positive integer) (in the present embodiment, the thicknesses tw3 of the second wall 53 is set to a value t4 for n=1 in the equation (4)).

[Math. 4]

$$t_4 = \frac{1}{2}\left(\frac{\lambda_0}{\sqrt{\varepsilon_1}}\right) \times (2n - 1) \qquad (4)$$

<Operation>

Figure 7:
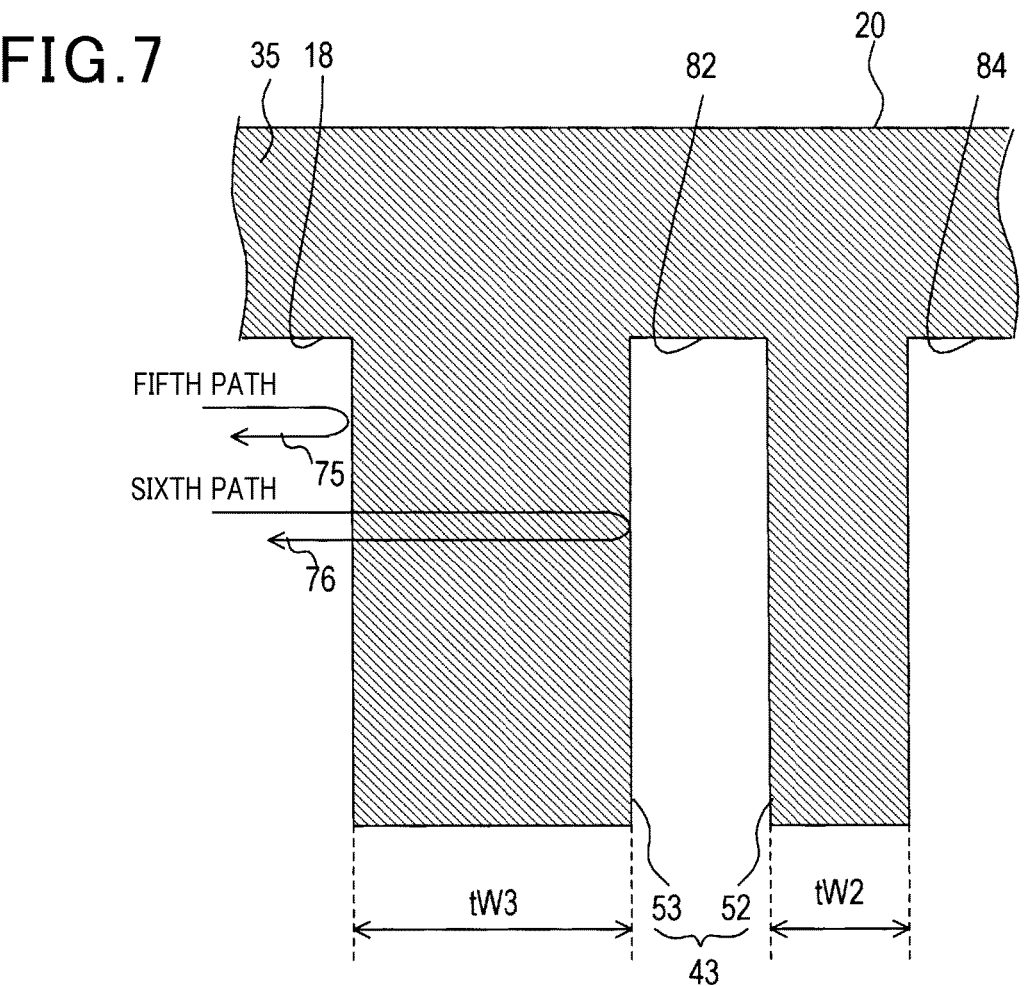
FIG. 7 is an example of paths of radar waves propagating through a second wall.

Various paths along which the radar waves are transmitted from the antenna section 62 to outside the radar apparatus 2 through the wall section 43 include, for example, as shown in FIG. 7, a fifth path 75 along which the radar waves are reflected from a surface of the second wall 53 to return into the radome-space 18, and a sixth path 76 along which the radar waves enter the second wall 53 and then reflected at the interface between the second wall 53 and the first air layer 82 to return into the radome-space 18.

A phase shift of the reflected wave propagating along the fifth path 75 relative to the radar wave incident on the surface of the second wall 53 corresponds to a half wavelength. A phase shift of the reflected wave propagating along the sixth path 76 relative to the radar wave incident on the surface of the second wall 53 corresponds to one wavelength. Therefore, for radar waves incident on the surface of the second wall 53 in the same phase, the reflected wave propagating along the fifth path and the reflected wave propagating along the sixth path cancel each other out.

Although the other paths are not shown, the radar waves are transmitted to outside the radar apparatus 2 through the second wall 53, the first air layer 82, the first wall 52, and the second air layer 84, are attenuated in the these walls and air layers.

<Advantages>

In the radar apparatus 2 set forth above, the wall section 43 including the first and second walls of different thicknesses allows the reflected waves that return into the radome-space 18 to be cancelled out due to the path difference therebetween, and can also attenuate the radar waves transmitted to outside the radar apparatus 2.

Figure 8:
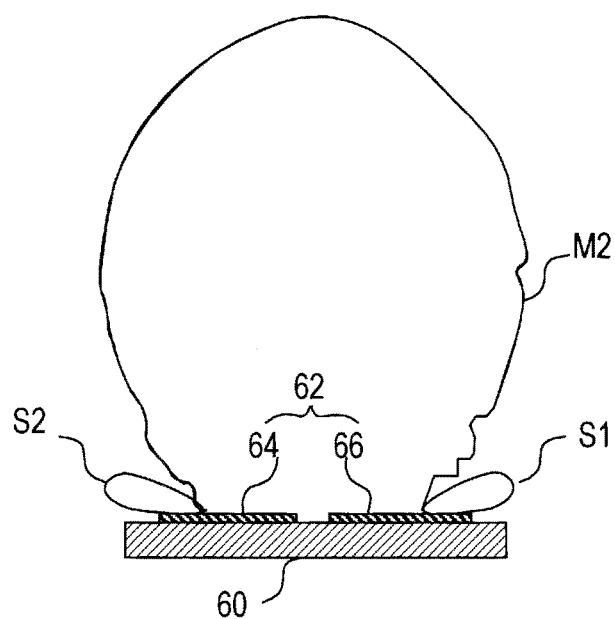
FIG. 8 is a schematic of combined directivity of an antenna section affected by reflected waves in the presence of a wall section.

The reflected waves from the first wall or the second wall on the opposing face 37 of the radome 20 into the radome-space 18 may adversely affect the combined directivity of the antenna section 62, thereby causing the main lobe M2 to be disturbed (see FIG. 8).

In the present embodiment, even in such a case, at least the second wall 53 is positioned closest to the aperture projection 39, which allows the reflected waves returned to the radome-space 18 to be reduced, thereby preventing the main lobe M2 from being disturbed.

Other Embodiments

The invention is not to be limited to the specific embodiments disclosed above. Variations and modifications of the described embodiments may be made without departing from the true spirit and scope of the invention.

Figure 9:
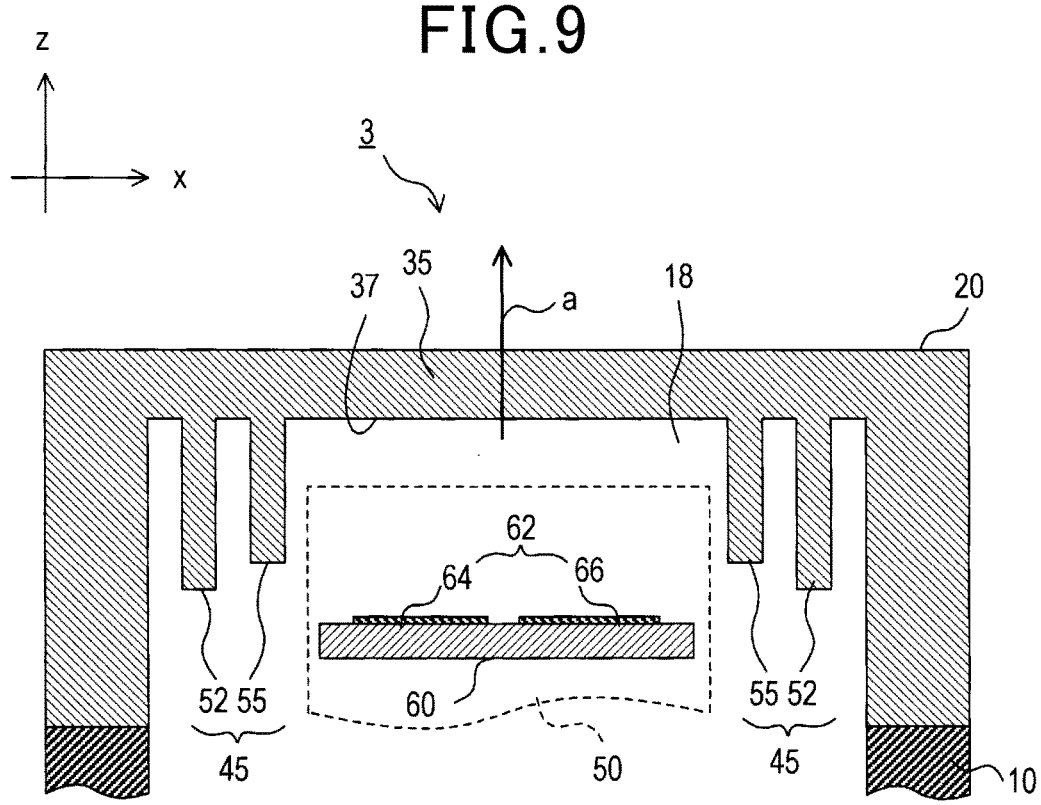
FIG. 9 is a schematic of a wall section of a radar apparatus in accordance with another embodiment (i) of the present invention.

(i) In the first embodiment, the first walls 51, 52 have the same height from the opposing face 37. Alternatively, for example, as shown in FIG. 9, a wall section 45 of a radar apparatus 3 may include the first wall 52 and a first wall 55 positioned closer to the aperture projection 39 than the first wall 52 and having a height less than the height of the first wall 52. This can reduce reflected waves from the first wall 52 or the first wall 53 into the radome-space 18, as in the second embodiment.

Figure 10:
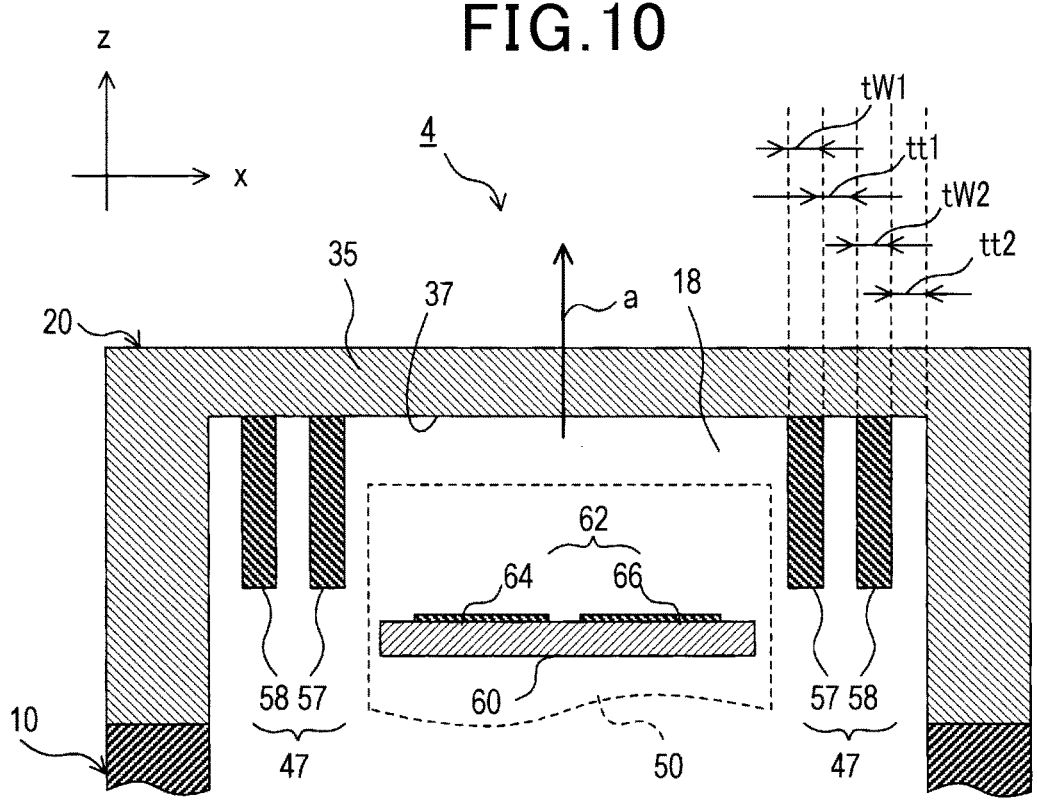
FIG. 10 is a schematic of a wall section of a radar apparatus in accordance with another embodiment (iii) of the present invention.

(ii) In the first embodiment, the first walls 51, 52 are formed of the same material as the radome 20. Alternatively, for example, as shown in FIG. 10, a radar apparatus 4 may be configured such that a wall section 47 includes the first walls 57, 58 formed of a material that is different in permittivity from the material of the radome 20 and is transmissive to the radar waves with high losses. This can increase a radar-wave attenuation during propagation of the radar waves through the first wall 57, 58.

(iii) In the first embodiment, the thicknesses tw1, tw2 of the respective first walls 51, 52 are both set to the same value equal to a quarter wavelength of the radar wave propagating in the transmissive material. This is the value for n of 1 in the equation (2). In general, n may be an arbitrary positive integer.

In each of the first and second embodiments, the spacing tt1 of the first air layer 82 is the value for n of 1 in the equation (3). Similarly, in general, n may be an arbitrary positive integer in the equation (3). Also, in the second embodiment, the thickness tw3 of the second wall is set to the value for n of 1 in the equation (4). Also in the equation (4), n may be an arbitrary positive integer.

Figure 11:
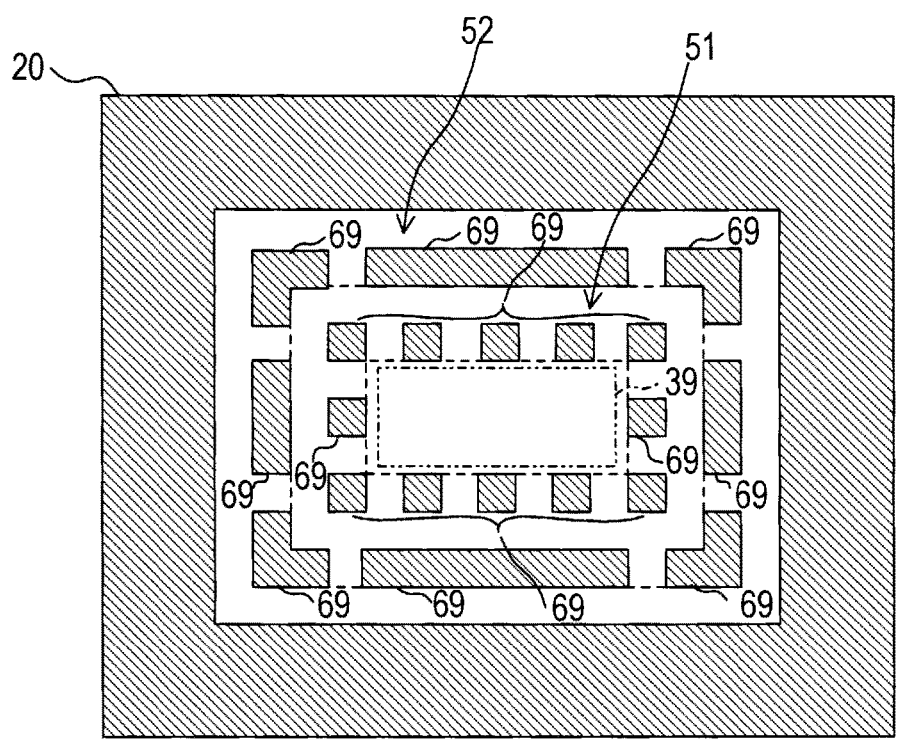
FIG. 11 is a schematic of a radome of a radar apparatus, as viewed from a body side, in accordance with another embodiment (iv) of the present invention.

(iv) In the first embodiment, each of the first walls 51, 52 is a single, continuous wall surrounding the outline of the aperture projection 39. Alternatively, for example, each of the first walls 51, 52 may be formed of a plurality of partial walls 69 as shown in FIG. 11

Figure 12:
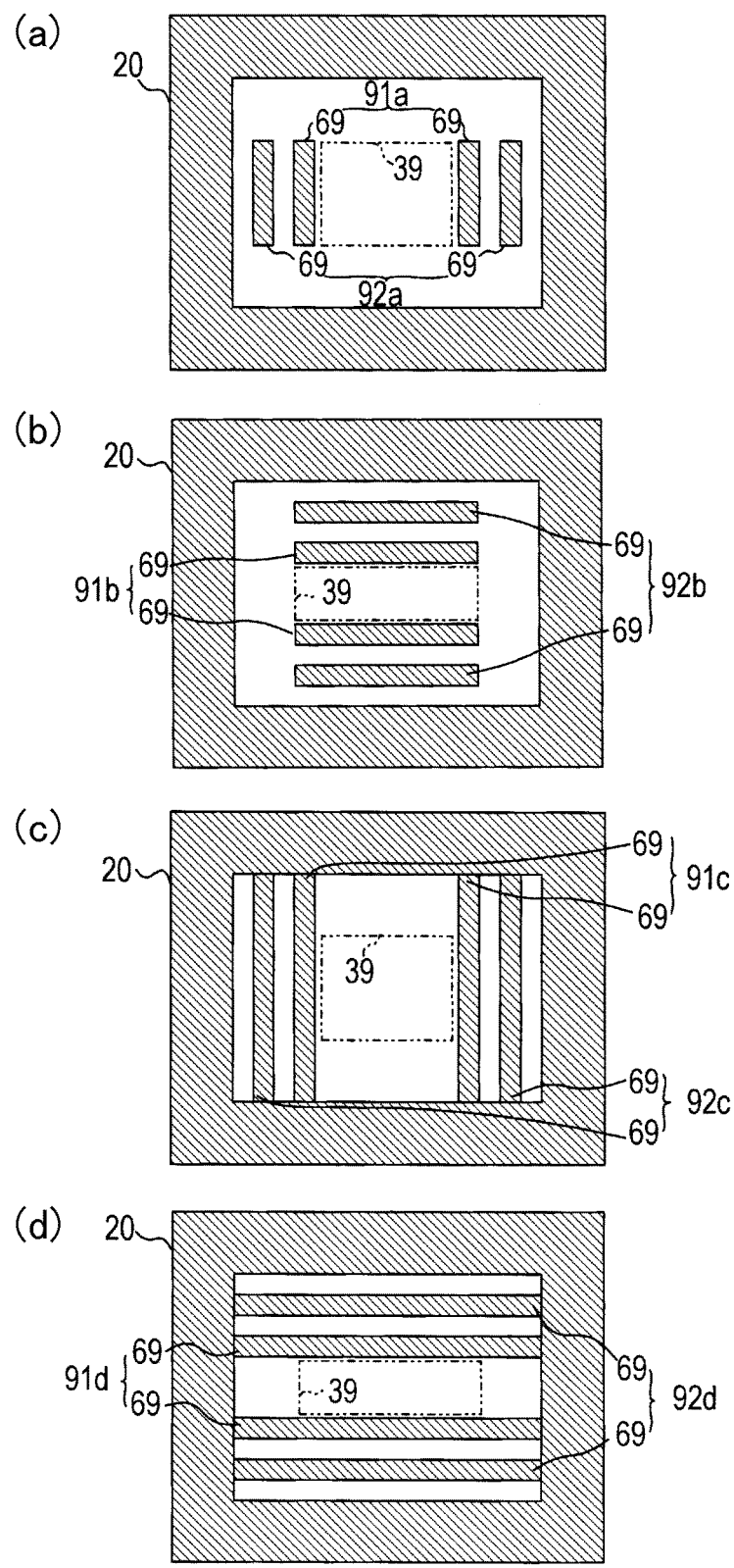
FIGS. 12(a)-12(d) are schematics of radomes of radar apparatuses, as viewed from a body side, in accordance with other embodiments (v) of the present invention.

(v) In the first embodiment, each of the first walls 51, 52 is a single, continuous wall surrounding the outline of the aperture projection 39. Alternatively, for example, each of the first walls 51, 52 may be formed so as to surround at least one portion of the outline of the aperture projection 39. More specifically, as shown in FIGS. 12(a), 12(b), the first walls 91a, 92b, and 91b, 92b may be partial walls extending along the opposite sides of the aperture projection 39. That is, the first walls may be formed intermittently along the outline of the projection 39.

Further, as shown in FIGS. 12(c), 12(d), portions of the first walls 91c, 92c, and 91d, 92d may be partial walls extending along the opposite sides of the aperture projection 39. That is, the first walls may be formed intermittently along the outline of the projection 39.

Although not shown, the first walls may be provided only in directions, in which directions the radar waves are to be reduced. Also regarding the second embodiment, similar alternative embodiments as set forth above are available.

Figure 13:
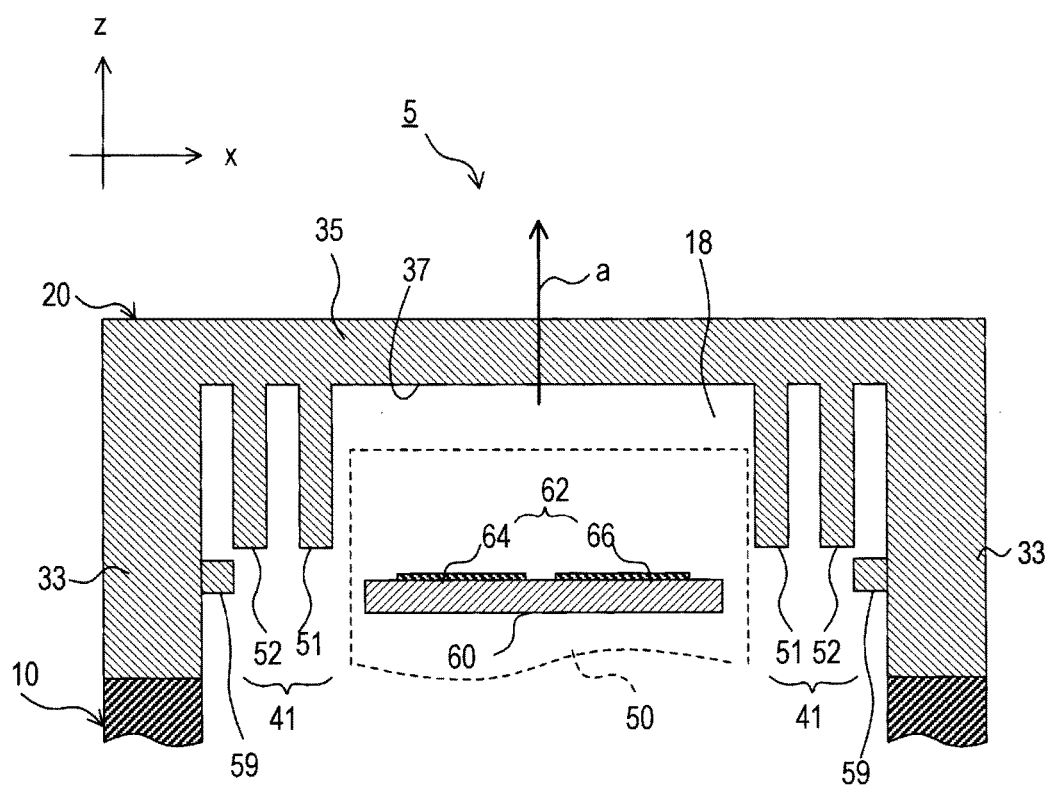
FIG. 13 is a schematic of a wall section and its third wall of a radar apparatus in accordance with another embodiment (vi) of the present invention.

(vi) In the first embodiment, the wall section 41 including the first walls 51, 52 are provided on the opposing face 37 of the radome 20. In addition, as shown in FIG. 13, third walls 59 protruding from the side walls 33 of the radome 20 into the radome-space 18 may be provided. The third walls 59 may be formed of the same material as the radome 20. Heights of the third walls 59 from the side walls 33 of the radome 20 may be set to a value equal to (2n−1) quarter wavelengths of the radar wave propagating in the transmissive material (where n is a positive integer). Preferably, the third walls 59 are as close to the circuit board 60 in the normal direction a that is the vertical direction as possible. This can reduce the radar waves transmitted outside also in the direction along the circuit board 60.

REFERENCE SIGNS LIST

1: Radar apparatus
10: Body
20: Radome
37: Opposing face
39: Aperture projection
41, 43, 45, 47: Wall section
51, 52: First wall
53, 92: Second wall
55, 58, 57, 91: First wall
62: Antenna section

The invention claimed is:

1. A radar apparatus comprising:
an antenna for at least either transmitting radar waves which are radio waves of a predetermined frequency or receiving reflected waves;
a radome transmissive to the radar waves; and
a wall section protruding from an opposing face of the radome into a space of the radome and extending, so as to continuously surround, an outline of an aperture projection, the opposing face being a face of the radome opposing the antenna, and the aperture projection being a projection of an aperture of the antenna onto the opposing face in a normal direction to the aperture; wherein
the wall section comprises a plurality of walls spaced away from each other in a direction from the aperture projection to outside the apparatus.

2. The apparatus of claim 1, wherein the plurality of walls include at least one first wall of a thickness set to (2n−1) quarter wavelengths of the radar wave propagating through the first wall (n being a positive integer).

3. The apparatus of claim 1, wherein the plurality of walls include at least one second wall of a thickness set to (2n−1) half wavelengths of the radar wave propagating through the second wall (n being a positive integer).

4. The apparatus of claim 1, wherein the plurality of walls include:
- at least one first wall of a thickness set to (2n−1) quarter wavelengths of the radar wave propagating through the first wall (n being a positive integer); and
- at least one second wall of a thickness set to (2n−1) quarter wavelengths of the radar wave propagating through the second wall (n being a positive integer), the second wall being positioned closer to the aperture projection than the first wall.

5. The apparatus of claim 1, wherein a spacing between adjacent walls of the plurality of walls is set to (2n−1) quarter wavelengths of the radar wave propagating in the space of the radome (n being a positive integer).

6. The apparatus of claim 1, wherein the walls are adjusted in height from the opposing face so as to reduce the reflected waves from the walls.

7. The apparatus of claim 6, wherein at least a wall of the plurality of walls positioned closest to the aperture projection has a height from the opposing face less than the height of its adjacent wall.

8. The apparatus of claim 1, wherein the walls are formed of the same material as the radome.

9. The apparatus of claim 1, wherein the walls are formed of a material capable of more attenuating the radio waves than the material of the radome.

* * * * *